(12) United States Patent
Kuwahara

(10) Patent No.: US 8,331,668 B2
(45) Date of Patent: Dec. 11, 2012

(54) IMAGE PROCESSING DEVICE

(75) Inventor: Toyoaki Kuwahara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 359 days.

(21) Appl. No.: 12/853,764

(22) Filed: Aug. 10, 2010

(65) Prior Publication Data
US 2011/0044542 A1 Feb. 24, 2011

(30) Foreign Application Priority Data

Aug. 21, 2009 (JP) ................. 2009-191528

(51) Int. Cl.
G06K 9/00 (2006.01)
(52) U.S. Cl. .................. 382/168; 382/169; 382/171
(58) Field of Classification Search .................. 382/168, 382/171, 169, 173, 131; 345/589, 617; 348/672, 348/674, 603, 631; 358/3.26, 521, 522, 3.19, 358/3.22
See application file for complete search history.

(56) References Cited

U.S. PATENT DOCUMENTS

| | | | | |
|---|---|---|---|---|
| 5,056,146 A | * | 10/1991 | Nishide | 382/131 |
| 6,009,193 A | * | 12/1999 | Mita | 382/168 |
| 6,798,544 B1 | * | 9/2004 | Chiba et al. | 358/3.22 |
| 6,873,441 B1 | * | 3/2005 | Kuwabara et al. | 358/3.26 |
| 7,791,766 B2 | * | 9/2010 | Hiramoto et al. | 358/3.19 |
| 8,139,157 B2 | * | 3/2012 | Someya et al. | 348/672 |
| 8,174,622 B2 | * | 5/2012 | Kanai | 348/672 |

FOREIGN PATENT DOCUMENTS

| | | | |
|---|---|---|---|
| JP | 2002165095 | * | 6/2002 |
| JP | 2009-037277 | | 2/2009 |

* cited by examiner

Primary Examiner — Anh Hong Do
(74) Attorney, Agent, or Firm — DLA Piper LLP (US)

(57) ABSTRACT

An image processing device that processes multivalue image data includes: a histogram storage section that stores an appearance frequency of each of gradation values; a palette storage section that stores the gradation value that corresponds to each of index values; an output section that accesses the histogram storage section data and outputs the appearance frequency of the gradation value of the piece of pixel data; a histogram generator that accesses the histogram storage section for each piece of the pixel data included in the image data and adds one to the appearance frequency of the gradation value of the piece of pixel data; and a palette generator that assigns, when the appearance frequency that is output from the output section indicates 0, the index value to the gradation value and accesses the palette storage section and stores the gradation value that corresponds to the index value.

5 Claims, 12 Drawing Sheets

IMAGE PROCESSING DEVICE

BACKGROUND

1. Technical Field

The present invention relates to a technique for converting input image data into indexed color image data.

2. Related Art

For an image processing device (such as a scanner, a printer, a copying machine or a combined machine), a technique is known, which converts input image data (e.g., 24-bit RGB full color image data) into indexed color image data (in which each pixel that is included in the input image data is represented by an index value) using a table (that is called a palette and in which an index value is assigned to each color as a color number) in order to reduce the amount of the image data that is stored in a storage device such as a memory.

The image processing device performs predetermined image processing on the input image data on the basis of an appearance frequency distribution of colors of the pixels that are included in the input image data. A technique for generating a histogram of the colors of the pixels that are included in the input image data is known (refer to, for example, JP-A-2009-37277).

In order to generate the histogram of the input image data and perform the index conversion (including generation of the palette), it is necessary to process each of the pixels that are included in the input image data. Thus, the processing load of the image processing device is large. For example, when both the histogram generation and the index conversion (including the generation of the palette) are performed, the processing load of the image processing device is larger.

SUMMARY

An advantage of some aspects of the invention is that it provides a technique for improving the efficiency of index conversion (including generation of a palette).

According to a first aspect of the invention, an image processing device that processes multivalue image data includes: a histogram storage section that stores an appearance frequency of each of gradation values; a palette storage section that stores the gradation value that corresponds to each of index values; an output section that accesses the histogram storage section for each of pieces of pixel data included in the image data and outputs the appearance frequency of the gradation value of the piece of pixel data; a histogram generator that accesses the histogram storage section for each piece of the pixel data included in the image data and adds one to the appearance frequency of the gradation value of the piece of pixel data; and a palette generator that assigns, when the appearance frequency that is output from the output section indicates 0, the index value to the gradation value and accesses the palette storage section and stores the gradation value that corresponds to the index value.

According to a second aspect of the invention, an image processing device that processes multivalue image data includes: a histogram storage section that stores an appearance frequency of each of gradation values; a palette storage section that stores a gradation value that corresponds to each of index values and is represented by bits that are fewer by a predetermined number of bits than bits that represent the gradation value of each of pieces of pixel data included in the image data; an output section that accesses the histogram storage section for each piece of the pixel data included in the image data and outputs appearance frequencies of a plurality of gradation values that have the same upper bits as the gradation value that is obtained by reducing the gradation value of the piece of pixel data by the predetermined number of bits; a histogram generator that accesses the histogram storage section for each piece of the pixel data included in the image data and adds one to the appearance frequency of the gradation value of the piece of pixel data; and a palette generator that assigns, when all the appearance frequencies that are output from the output section indicate 0, the index value to the gradation value obtained by reducing the gradation value of the piece of pixel data by the predetermined number of bits and accesses the palette storage section and stores the gradation value that corresponds to the index value.

In the image processing device according to the second aspect of the invention, the histogram storage section is divided into a plurality of storage regions that are provided for the predetermined number of bits and can be accessed in parallel, and the storage regions store the appearance frequencies of the gradation values, respectively, each of the gradation values being represented by bits that are fewer by the predetermined number of bits than the bits of the gradation value of the piece of pixel data included in the image data, the values of the predetermined number of bits ranging from the minimum value to the maximum value, and the output section accesses the storage regions in parallel for each piece of the pixel data included in the image data and outputs, in parallel, the appearance frequencies of the gradation values obtained by reducing the gradation values of the pieces of pixel data by the predetermined number of bits.

According to a third aspect of the invention, an image processing device that processes multivalue image data includes: a histogram storage section that stores an appearance frequency of each of gradation values, each of which is represented by bits that are fewer by a predetermined number of bits than bits of a gradation value of each of pieces of pixel data included in the image data; a palette storage section that stores the gradation value that corresponds to each of index values and is represented by bits that are fewer by the predetermined number of bits than the bits of the gradation value of the piece of pixel data included in the image data; an output section that accesses the histogram storage section for each piece of the pixel data included in the image data and outputs the appearance frequency of the gradation value that is obtained by reducing the gradation value of the piece of pixel data by the predetermined number of bits; a histogram generator that accesses the histogram storage section for each piece of the pixel data included in the image data and adds one to the appearance frequency of the gradation value that is obtained by reducing the gradation value of the piece of pixel data by the predetermined number of bits; and a palette generator that assigns, when the appearance frequency that is output from the output section indicates 0, the index value to the gradation value obtained by reducing the gradation value of the piece of pixel data by the predetermined number of bits and accesses the palette storage section and stores the gradation value that corresponds to the index value.

In the image processing device according to the first aspect of the invention, a histogram and a palette are generated for each of pieces of image data of one frame.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

The first embodiment of the invention is described below with reference to the accompanying drawings.

Figure 1:
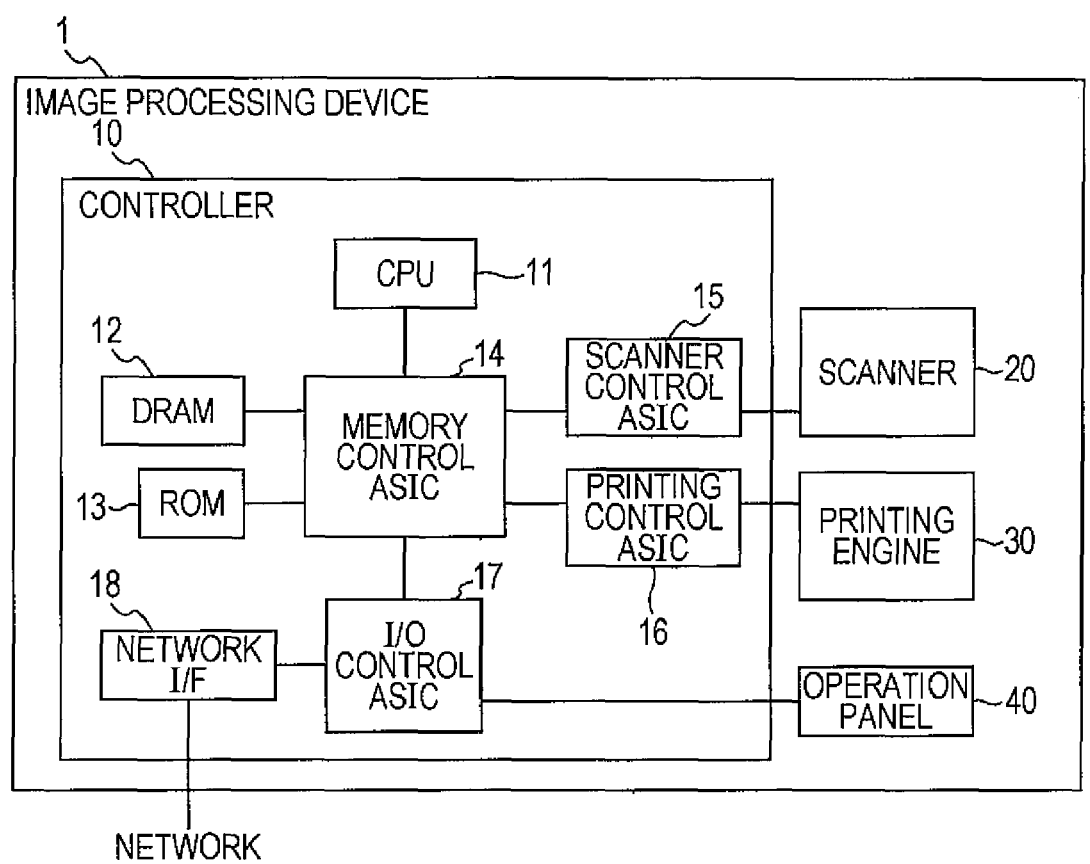
FIG. 1 is a block diagram showing an example of an outline hardware configuration of an image processing device according to a first embodiment of the invention.

FIG. 1 is a diagram showing an example of an outline hardware configuration of an image processing device 1 according to the first embodiment of the invention. The image processing device 1 according to the present embodiment is a so-called copying machine that includes a scanning function and a printing function.

The image processing device 1 includes a controller 10, a scanner 20, a printing engine 30 and an operation panel 40.

The controller 10 includes a CPU 11, a DRAM 12, a ROM 13, a memory control application specific integrated circuit (ASIC) 14, a scanner control ASIC 15, a printing control ASIC 16, an input/output (I/O) control. ASIC 17 and a network interface (I/F) 18.

The CPU 11 executes a predetermined program to control the entire image processing device 1. The DRAM 12 is a volatile memory that temporarily stores data, a program and the like. The DRAM 12 is, for example, a DDR-SDRAM. The ROM 13 is a nonvolatile memory that stores data, a program and the like. The ROM 13 is, for example, a flash memory. The ROM 13 does not need to be connected to the memory control ASIC 14 and may be connected to the I/O control ASIC 17.

The memory control ASIC 14 is connected to the DRAM 12 and the ROM 13. The memory control ASIC 14 is a unit that controls access to the DRAM 12 and access to the ROM 13. The memory control ASIC 14 causes image data (output from the scanner control ASIC 15) to be stored in the DRAM 12. In addition, for example, the memory control ASIC 14 outputs the image data (stored in the DRAM 12) to the printing control ASIC 16. Furthermore, for example, the memory control ASIC 14 causes image data (that is transmitted from a host computer (located on a network) through the I/O control ASIC 17 and is to be printed) to be stored in the DRAM 12.

In the present embodiment, the memory control ASIC 14 has a function of generating a histogram of image data output from the scanner control ASIC 15, a function of generating a palette for image data output from the scanner control ASIC 15 and a function of performing index conversion on image data output from the scanner control ASIC 15 as described later.

The scanner control ASIC 15 is a unit that controls an image reading operation of the scanner 20 and generates image data that can be processed by the controller 10. The scanner control ASIC 15 controls an image sensor, a motor, an A/D converter, an auto document feeder (ADF) and the like (that are included in the scanner 20) so that the scanner 20 reads an image of an original sheet. In addition, for example, the scanner control ASIC 15 performs predetermined image processing (for example, shading correction, gamma correction and the like) on the image data output from the scanner 20 and outputs the image data to the memory control ASIC 14.

The printing control ASIC 16 is a unit that generates data (that can be processed by the printing engine 30 and is to be printed) and controls a printing operation of the printing engine 30. The printing control ASIC 16 reads the image data from the DRAM 12 and performs predetermined image processing (for example, color conversion, compression, decompression, and, digitalization) on the image data to generate data that is to be printed. The printing control ASIC 16 transmits the generated data (to be printed) to the printing engine 30 and causes the printing engine 30 to perform the printing operation.

The I/O control ASIC 17 is a unit that controls I/O devices and I/F devices. The I/O devices include the operation panel 40 and a hard disk device. The I/F devices include the network I/F 18, a USB I/F and a parallel I/F. For example, the I/O control ASIC 17 receives image data from the network I/F 18 and transfers the received image data to the DRAM 12 by means of direct memory access (DMA). In addition, for example, the I/O control ASIC 17 transfers a signal (output from the operation panel 40) to the CPU 11 and transfers graphic data (output from the CPU 11) to the operation panel 40.

The network I/F 18 is a unit that transmits and receives various data to and from a device such as the host computer that is located on the network. For example, the network I/F 18 receives a print job from the host computer and transfers the print job to the DRAM 12.

The scanner 20 is a so-called flatbed image scanner and has an image reading surface on a housing of the scanner 20. The scanner 20 may include an ADF. When the scanner 20 does not include an ADF, the scanner 20 irradiates the original sheet fixed on the image reading surface with light from a lower side of the sheet and reads the image of the original sheet while moving the image sensor. When the scanner includes the ADF, the scanner 20 causes the image sensor to be fixed at a predetermined position and reads the image while causing the ADF to transport the original sheet. The scanner 20 performs analog-to-digital (A/D) conversion on the read image data and outputs the converted image data to the scanner control ASIC 15.

The printing engine 30 is a unit that prints the data (supplied from the printing control ASIC 16) onto a print medium. The printing engine 30 is a laser-type printing engine and includes a toner cartridge, a photosensitive drum, a laser beam irradiating mechanism, a transferring mechanism, a sheet transporting mechanism, and a sheet feeding/discharging mechanism. The printing engine 30 is not limited to the laser-type printing engine and may be an ink jet type printing engine.

The operation panel 40 is a unit that serves as an input/output interface between a user and the image processing device 1 and is included in a housing of the image processing device 1. The operation panel 40 includes a display (such as a liquid crystal display or an organic electro-luminescence display), a touch panel and a hard switch.

The main configuration of the image processing device 1 is described above to explain features of the invention. The image processing device 1 is not limited to the aforementioned configuration. The above description does not mean that other configurations of general image processing devices are not acceptable for the image processing device 1.

Figure 2:
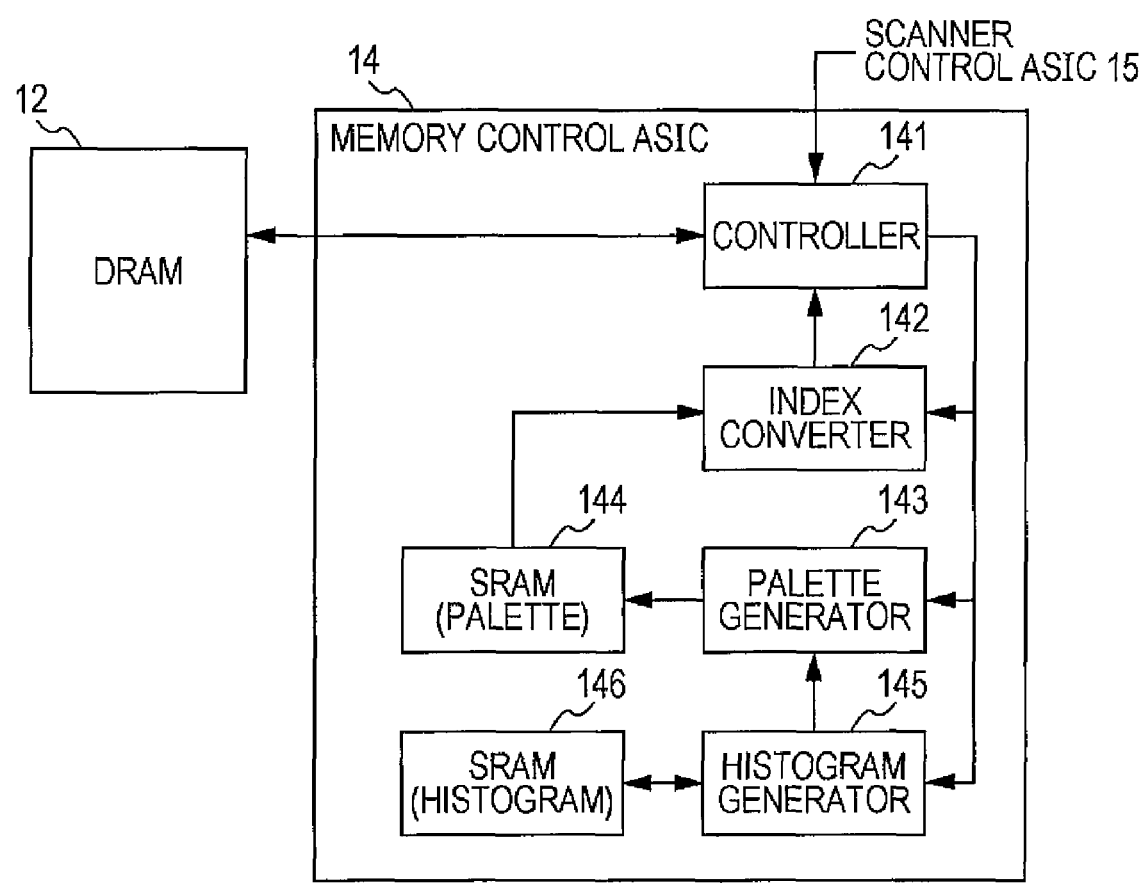
FIG. 2 is a block diagram showing an example of a configuration (that is related to histogram generation, palette generation and index conversion) of the image processing device.

FIG. 2 is a block diagram showing an example of a configuration (that is related to histogram generation, palette generation and the index conversion) of the image processing device 1. The image data that is output from the scanner control ASIC 15 is constituted by pixel data pieces (each of which has a gradation value of each of RGB colors).

The memory control ASIC 14 includes a controller 141, an index converter 142, a palette generator 143, a SRAM 144, a histogram generator 145 and a SRAM 146.

The controller 141 is a circuit that controls the entire memory control ASIC 14 and controls access to the DRAM 12. A section that controls access to the DRAM 12 may be independent of the controller 141.

For example, the controller 141 receives the pixel data pieces that have been sequentially output from the scanner control ASIC 15. The controller 141 outputs the same pixel data pieces as the received pixel data pieces to the DRAM 12, the histogram generator 145 and the palette generator 143. When the palette generator 143 completes a palette, the controller 141 sequentially reads pixel data pieces that are included in image data (of one frame (one page)) stored in the DRAM 12. The controller 141 then outputs the read pixel data pieces to the index converter 142.

The controller 141 receives index values of indexed image data (formed by causing the image data to be subjected to the index conversion) from the index converter 142. The controller 141 then outputs the index values of the image data to the DRAM 12. The controller 141 acquires the generated palette from the SRAM 144 and associates the indexed image data with the palette. The controller 141 then causes the indexed image data (associated with the palette) to be stored in the DRAM 12. In addition, the controller 141 may acquire a histogram (generated by the histogram generator 145) from the SRAM 146 and associate the indexed image data with the histogram. The controller 141 may cause the indexed image data (associated with the histogram) to be stored in the DRAM 12.

The histogram generator 145 is a circuit that causes a frequency of a gradation value of each pixel data piece to be stored in the SRAM 146 on the basis of the pixel data pieces that have been sequentially output from the controller 141. When the histogram generator 145 receives the pixel data piece from the controller 141, the histogram generator 145 reads, from the SRAM 146, the frequency data (that corresponds to the gradation value of the pixel data piece) and outputs the frequency data to the palette generator 143. After that, the histogram generator 145 increments the frequency data by one and writes the incremented frequency data into the SRAM 146. The histogram generator 145 generates a histogram of each image data of one frame (one page).

The SRAM 146 is a volatile memory and stores a histogram of gradation values of pixel data pieces included in the image data. The SRAM 146 has regions to store data pieces (frequencies) at addresses (gradation values), respectively (refer to FIG. 3).

The palette generator 143 is a circuit that assigns an index value to each gradation value on the basis of the pixel data pieces (sequentially output from the controller 141) and the frequency data pieces (that correspond to the pixel data pieces and have been output from the histogram generator 145) and causes the gradation values (that correspond to the index values, respectively) to be stored in the SRAM 144. When the frequency data piece that corresponds to the pixel data piece ((gradation value) to be processed) indicates 0 (or when the pixel data piece having the gradation value is first detected), the palette generator 143 assigns the index value to the gradation value and associates the gradation value with the index value and causes the gradation value (associated with the index value) to be stored in the SRAM 144. The palette generator 143 generates a palette for each image data of one frame (one page).

The SRAM 144 is a volatile memory and stores a palette in which the index values and the gradation values (of the pixel data pieces included in the image data) are associated with each other. The SRAM 144 has regions to store data pieces (gradation values) at respective addresses, respectively (index values) (refer to FIG. 3).

The index converter 142 is a circuit that references the palette stored in the SRAM 144 and converts the pixel data pieces (sequentially output from the controller 141) into index values on the basis of the palette and outputs the index values to the DRAM 12 through the controller 141.

Figure 5:
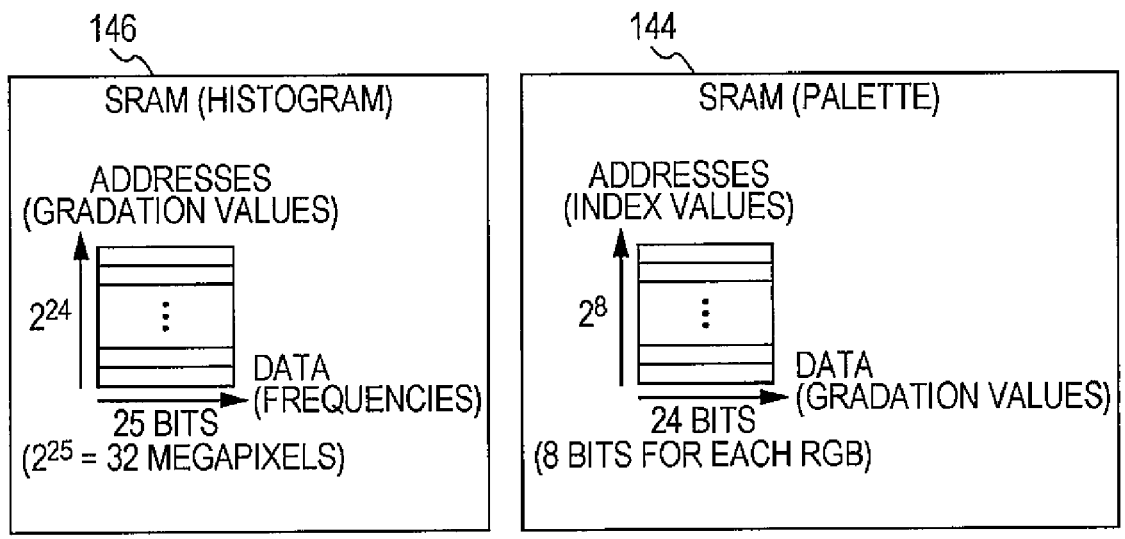
FIG. 5 is a diagram showing the size of a SRAM that stores a histogram and the size of a SRAM that stores a palette.

The following describes the SRAM 146 and the SRAM 144 using specific examples. FIG. 5 is a diagram showing the size of the SRAM 146 that stores the histogram and the size of SRAM 144 that stores the palette. FIG. 5 shows the case in which image data (A4/600 dpi/32 megapixels/8 bits for each RGB) is converted into indexed color image data.

The SRAM 146 has a capacity to store frequency data of at least 25 bits ($2^{25}$ can represent 32 megapixels) at each of $2^{24}$ (16777216 gradations) addresses.

The SRAM 144 has a capacity to store gradation value data of at least 24 bits (8 bits for each RGB) at each of $2^8$ (256 index values) addresses.

The main configuration of the memory control ASIC 14 is described above to explain features of the invention. However, the memory control ASIC 14 is not limited to the aforementioned configuration. The above description does not mean that other configurations of general memory control ASICs are removed from the memory control ASIC 14. For example, a single independent circuit may include a section (of the index converter 142) that controls access to the SRAM 144 and a section (of the palette generator 143) that controls access to the SRAM 144. In addition, another single independent circuit may include a section (of the histogram generator 145) that controls access to the SRAM 146.

Figure 3:
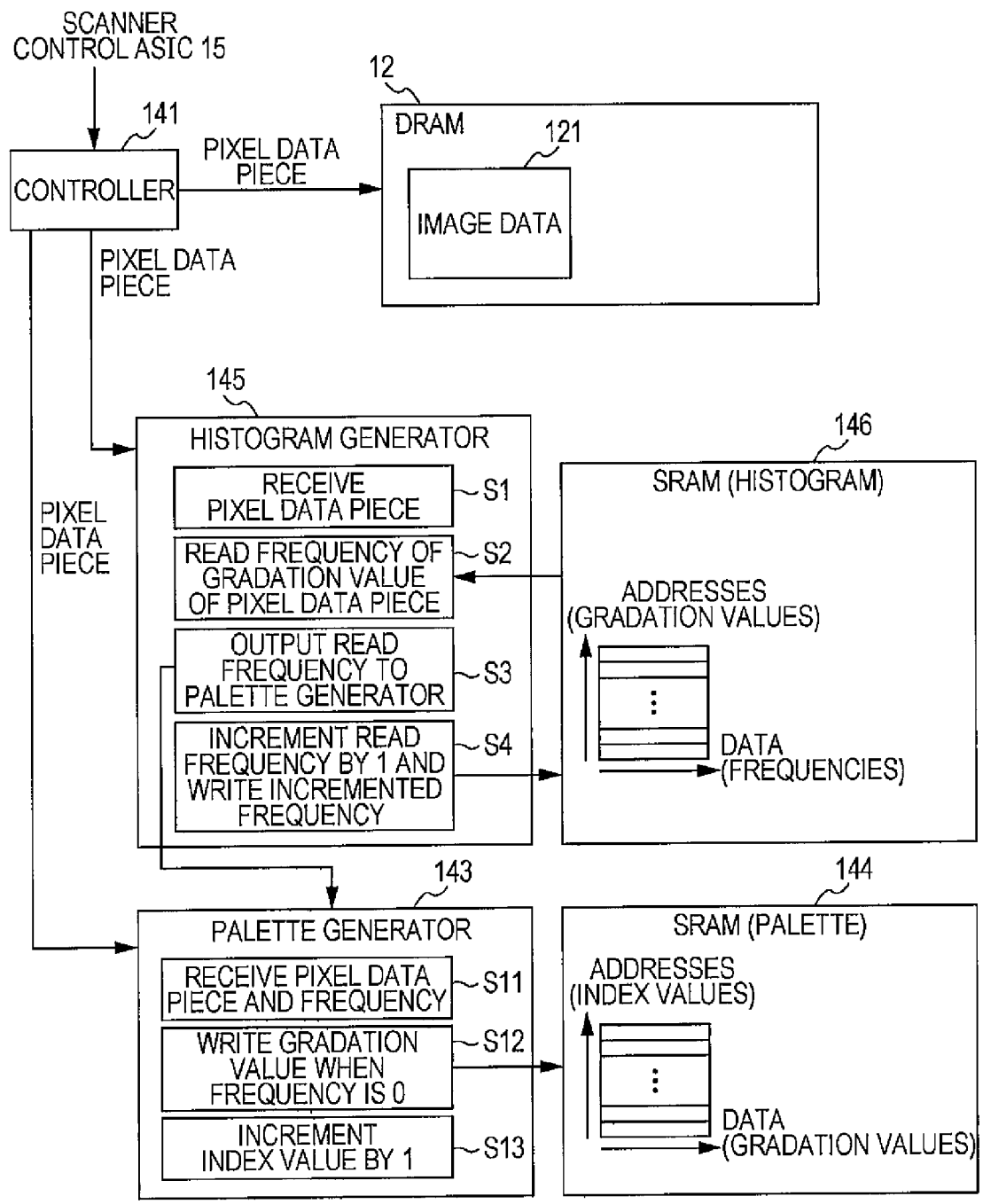
FIG. 3 is a diagram showing a process for the histogram generation and a process for the palette generation, which are performed in the image processing device.

FIG. 3 is a diagram showing a process for generating a histogram and a process for generating a palette, which are performed in the image processing device 1. FIG. 3 shows the case in which image data of one frame is processed.

The controller 141 receives the pixel data pieces (sequentially output from the scanner control ASIC 15) and outputs the same pixel data pieces as the received pixel data pieces to the DRAM 12, the histogram generator 145 and the palette generator 143. Specifically, the controller 141 sequentially writes the pixel data pieces into the DRAM 12 so that image data 121 of one frame is stored in the DRAM 12. While the controller 141 is performing this process, the histogram generator 145 generates a histogram of the image data 121 and the palette generator 143 generates a palette for the image data 121.

The histogram generator 145 performs steps S1 to S4 for each of pieces of pixel data.

In step S1, the histogram generator 145 receives the pixel data piece from the controller 141.

In step S2, the histogram generator 145 sets a gradation value of the pixel data piece (received in step S1) as an address and reads, from the SRAM 146, the frequency data that is stored at the address.

In step S3, the histogram generator 145 outputs the frequency data read in step S2 to the palette generator 143.

In step S4, the histogram generator 145 increments the frequency data read in step S2 by one. In addition, the histogram generator 145 sets the gradation value of the pixel data piece (received in step S1) as an address and writes the incremented frequency data at the address of the SRAM 146.

The palette generator 143 performs steps S11 to S13 for each of pieces of pixel data.

In step S11, the palette generator 143 receives the pixel data piece from the controller 141 and receives the frequency data piece that corresponds to the pixel data piece and has been output from the histogram generator 145 in step S3.

In step S12, the palette generator 143 determines whether or not the frequency data received in step S11 indicates 0. When the frequency data indicates 0, the palette generator 143 assigns an index value to the pixel data piece received in step S11 and sets the index value as an address and writes the gradation value of the pixel data piece at the address of the SRAM 144. Then, the palette generator 143 causes the process to proceed to step S13. On the other hand, when the frequency data does not indicate 0, the palette generator 143 determines that an index value is already assigned to the pixel data piece. The palette generator 143 then causes the process to return to step S11 in order to process the next pixel data piece.

In the present embodiment, the number of index values is predetermined (for example, 256 index values). The palette generator 143 assigns index values in ascending order from the minimum index value (for example, in order from 0 to 255). The palette generator 143 stores index values that are to be assigned in step S12. The order of the assignment of the index values is not limited to the ascending order. The index values may be assigned in descending order. The index values may be assigned in an order that is based on a predetermined rule.

In step S13, the palette generator 143 increments the index value (assigned in step S12) by one. When the incremented index value exceeds the predetermined maximum value (for example, 255 when the number of the index values is 256) and the pixel data piece (to be processed) is not the last pixel of the image data of one frame, the palette generator 143 stops the generation of the palette. In other words, the palette generator 143 does not perform steps S11 to S13 for the next and subsequent pixel data pieces.

As described above, the image data of one frame is stored in the DRAM 12, and the histogram and the palette are generated for the image data. When the generation of the palette is stopped, the controller 141 does not need to output the pixel data pieces to the palette generator 143, and the palette generator 143 does not need to receive the pixel data pieces.

Figure 4:
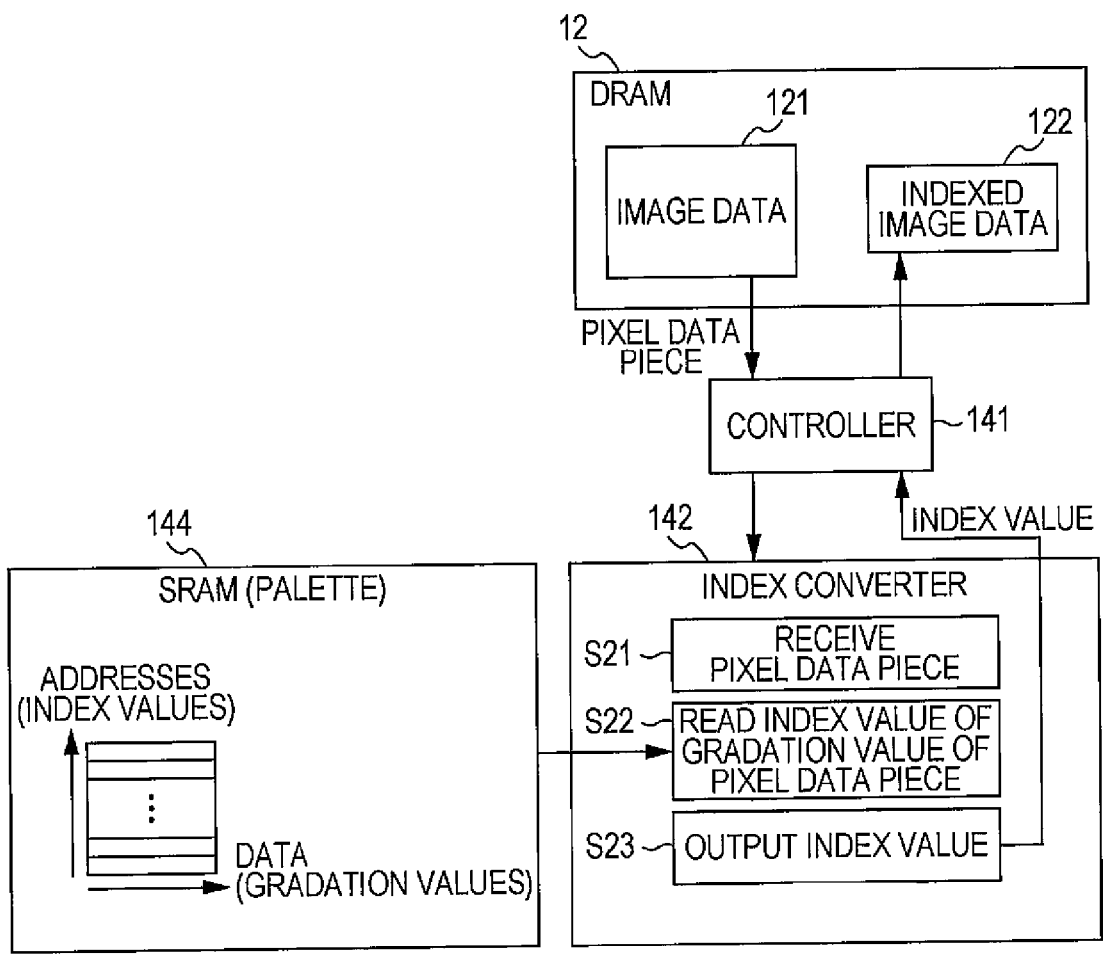
FIG. 4 is a diagram showing a process for the index conversion that is performed in the image processing device.

FIG. 4 is a diagram showing a process for the index conversion that is performed in the image processing device 1. FIG. 4 shows the case in which the image data of one frame is processed after the palette shown in FIG. 3 is completed.

When the palette generator 143 completes the palette, the controller 141 sequentially reads the pixel data pieces (included in the image data 121 stored in the DRAM 121) and outputs the read pixel data pieces to the index converter 142. The controller 141 writes the index values (sequentially output from the index converter 142) into the DRAM 12 and causes indexed image data 122 (formed by causing the image data 121 to be subjected to the index conversion) to be stored in the DRAM 12. When the indexed image data 122 is completed, the image data 121 may be deleted from the DRAM 12.

The index converter 142 performs steps S21 to S23 for each of pieces of pixel data.

In step S21, the index converter 142 receives the pixel data piece from the controller 141.

In step S22, the index converter 142 sequentially changes the index value in order from the minimum value to the maximum value (for example, in order from 0 to 255) and reads gradation value data from the SRAM 144 for each index value (address). The index converter 142 compares each read gradation value data with the gradation value of the pixel data piece (received in step S21) and specifies an index value that corresponds to the read gradation value that matches the gradation value of the pixel data piece received in step S21. In other words, the index converter 142, repeatedly accesses the SRAM 144 until the index converter 142 detects the index value that corresponds to the read gradation value that matches the gradation value of the received pixel data piece.

In step S23, the index converter 142 outputs, to the controller 141, the index value that corresponds to the pixel data piece received in step S21 and has been specified in step S22.

As described above, the image data 121 of one frame is converted into the indexed image data 122, and the indexed image data 122 is stored in the DRAM 12. After the indexed image data 122 is completed, the controller 141 reads the palette from the SRAM 144 and associates the indexed image data 122 with the palette. The controller 141 then causes the indexed image data 122 (associated with the palette) to be stored in the DRAM 12.

The first embodiment of the invention is described above. According to the first embodiment, the efficiency of the index conversion (including the generation of the palette) can be improved. In the present embodiment, while the histogram is being generated, the palette generator 143 generates the palette while referencing values of the histogram. In this configuration, it is not necessary to determine, for each of pieces of pixel data, whether or not an index value that corresponds to the gradation value of the piece of pixel data is already assigned during the generation of the palette. Thus, the index conversion is efficiently performed.

In the first embodiment, the index converter 142 repeatedly accesses the SRAM 144 for each of pieces of pixel data until the index converter 142 detects the index value that corresponds to the gradation value of the piece of pixel data (in step S22 of FIG. 4). Thus, when the proportion of pixel data pieces having gradation values corresponding to large index values among all the pixel data pieces is large, the processing load is large.

To avoid this, the SRAM 144 may be configured so that gradation value data that corresponds to multiple index values (addresses) can be read in parallel, and the index converter 142 may be configured so that the gradation value data read in parallel can be compared with the gradation value of the pixel data piece (to be processed) in parallel.

Specifically, when the SRAM 144 needs to have a capacity to store gradation value data of 24 bits (8 bits for each RGB) at each of $2^8$ (256 index values) addresses, the SRAM 144 includes 256 flip-flop circuits that store the gradation value data of 24 bits. The flip-flop circuits correspond to the index values of 0 to 255, respectively. In addition, the flip-flop circuits can be accessed in parallel.

The index converter 142 includes comparator circuits that correspond to the flip-flop circuits, respectively. The index converter 142 causes the comparator circuits to receive the pixel data piece (to be processed). In addition, the index converter 142 causes the comparator circuits to receive the gradation value data that is read in parallel by the flip-flop circuits. The index converter 142 references comparison results output in parallel from the comparator circuits and specifies an index value of the pixel data piece that is to be processed.

Since the SRAM 144 and the index converter 142 are configured as described above, the index converter 142 accesses the SRAM 144 once in order to specify the index value of each of pieces of pixel data. Thus, the processing load can be reduced.

Next, modified examples (first and second modified examples) of the first embodiment are described.

In the first embodiment, the palette is generated using the gradation values (of 24 bits in the example of FIG. 5) of the original image data without changing the numbers of bits of the gradation values. The number of gradations that are expected to appear is much larger than the maximum number (256 index values in the example of FIG. 5) of the index values. Therefore, there is a high possibility that the number of index values that can be assigned during the generation of the palette is not sufficient and the palette cannot be generated.

In the first modified example, the number of the gradations of the original image data is reduced before the palette is generated. In the second modified example, the number of the gradations of the original image data is reduced before the histogram is generated. Details of the modified examples, which are different from the first embodiment, are mainly described below.

First Modified Example

Figure 6:
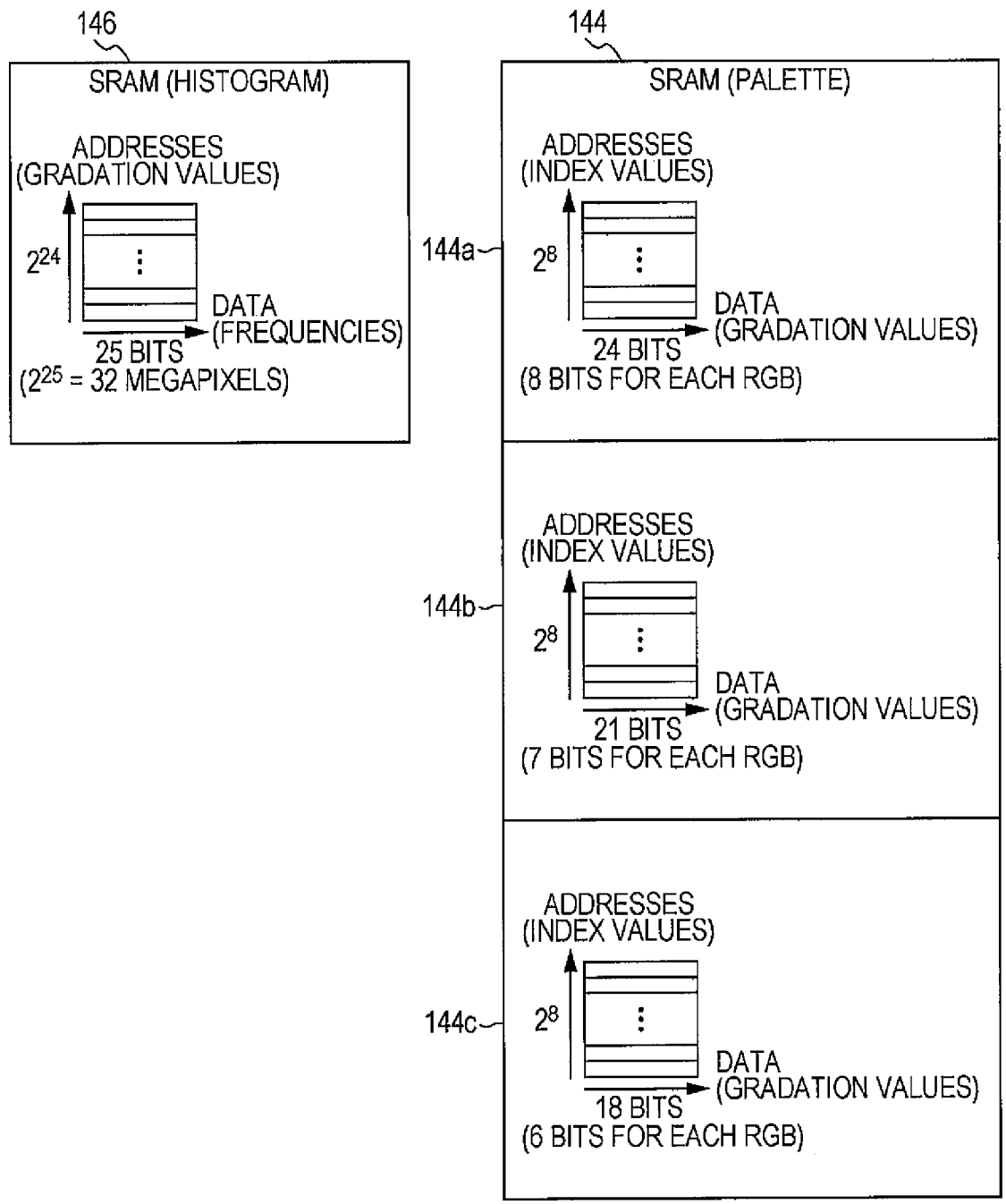
FIG. 6 is a diagram showing the size of the SRAM that stores the histogram and the sizes of SRAMS that store palettes in which the amounts of data are reduced (modified example 1).

In the first modified example, the SRAM 144 is constituted by three SRAMs 144a, 144b and 144c while the numbers of gradations of pixel data pieces stored in the SRAMs 144a to 144c are different from each other as shown in FIG. 6.

The SRAM 144a has a capacity to store gradation value data of 24 bits (8 bits for each RGB) at each of $2^8$ (256 index values) addresses. The SRAM 144b has a capacity to store gradation value data of 21 bits (7 bits for each RGB, which are lower by 1 bit) at each of $2^8$ (256 index values) addresses. The SRAM 144c has a capacity to store gradation value data of 18 bits (6 bits for each RGB, which are lower by 2 bits) at each of $2^8$ (256 index values) addresses.

When the histogram generator 145 receives a pixel data piece from the controller 141, the histogram generator 145 reads a necessary number of frequency data pieces on the basis of the number of gradations of each of pieces of pixel data stored in each of the SRAMs 144a to 144c and outputs the read frequency data pieces to the palette generator 143.

Specifically, for the 24-bit gradations, the histogram generator 145 sets a gradation value (24 bits) of the pixel data piece (to be processed) as an address and reads one frequency data piece from the SRAM 146 and outputs the read frequency data piece to the palette generator 143.

For the 21-bit gradations, the histogram generator 145 sequentially changes the value of predetermined 3 bits (1 bit for each RGB) included in the gradation value (24 bits) of the pixel data piece (to be processed) in order from the minimum value to the maximum value and sets each gradation value as an address and reads 8 frequency data pieces and outputs the read frequency data pieces to the palette generator 143.

For the 18-bit gradations, the histogram generator 145 sequentially changes the value of predetermined 6 bits (2 bit for each RGB) included in the gradation value (24 bits) of the pixel data piece (to be processed) in order from the minimum value to the maximum value and sets each gradation value as an address and reads 64 frequency data pieces and outputs the read frequency data pieces to the palette generator 143.

Figure 7:
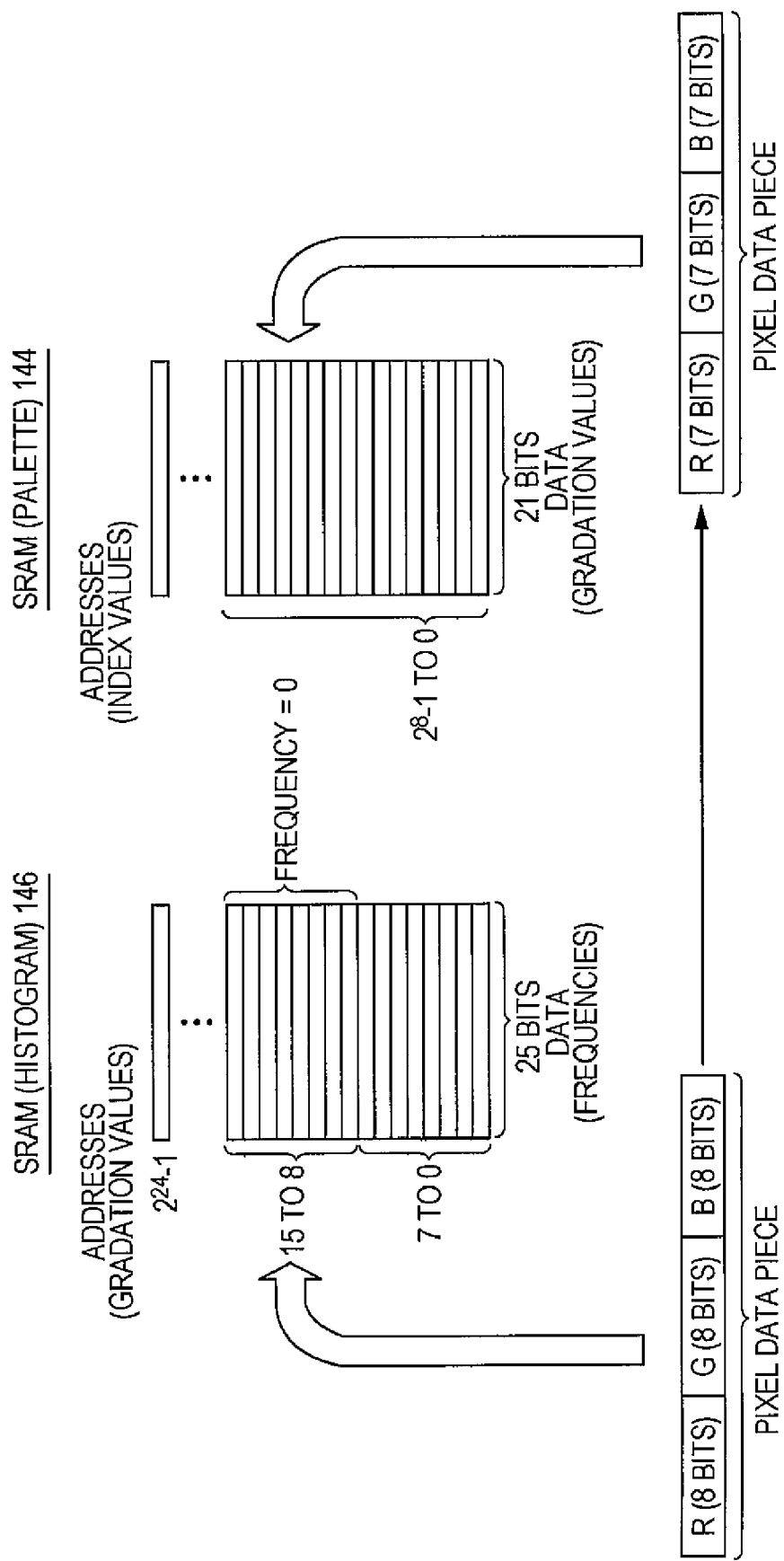
FIG. 7 is a diagram showing a process for generating the palette in which the amount of data is reduced (modified example 1).

For example, as shown in FIG. 7, when the gradations of 24 bits are reduced to the gradations of 21 bits in order to generate the palette, the gradation values (addresses) of the SRAM 146 are classified into groups of 8 consecutive gradation values. The histogram generator 145 reads 8 frequency data pieces of a group to which the gradation value of the pixel data piece (to be processed) belongs. The histogram generator 145 outputs all the read frequency data pieces (that correspond to the 8 gradation values) to the palette generator 143. Similarly, when the gradations of 24 bits are reduced to the gradations of 18 bits, frequency data pieces that correspond to 64 consecutive gradation values are treated as one frequency data piece.

After the histogram generator 145 outputs the necessary number of frequency data pieces to the palette generator 143 on the basis of the number of gradations of each piece of pixel data stored in each of the SRAMs 144a to 144c, the histogram generator 145 increments, by one, the frequency data that corresponds to the gradation value of the pixel data piece in the same manner as the first embodiment. Then, the histogram generator 145 causes the incremented frequency data to be stored in the SRAM 146.

The palette generator 143 assigns an index value to each gradation value on the basis of the pixel data piece (output from the controller 141) and the frequency data (that has been output from the histogram generator 145 and corresponds to the number of gradations of each piece of pixel data stored in each of the SRAMs 144a to 144c) and causes the gradation values (that correspond to the index values, respectively) to be stored in the SRAMs 144a to 144c.

For the palette generated for the gradation values of 24 bits, when the one frequency data piece that is output from the histogram generator 145 indicates 0, the palette generator 143 assigns an index value to the gradation value (24 bits) of the pixel data piece and sets the index value as an address and causes the pixel data piece to be stored in the SRAM 144a.

For the palette generated for the gradation values of 21 bits, when all the eight frequency data pieces that are output from the histogram generator 145 indicate 0, the palette generator 143 assigns an index value to the gradation value (24 bits) of the pixel data piece. As shown in FIG. 7, the palette generator 143 removes the lowest one bit of each RGB of the pixel data piece (of 24 bits or 8 bits for each RGB) to form the pixel data piece (of 21 bits or 7 bits for each RGB). The palette generator 143 then sets the assigned index value as an address and causes the 21-bit pixel data piece to be stored in the SRAM 144b.

For the palette generated for the gradation values of 18 bits, when all the sixty four frequency data pieces that are output from the histogram generator 145 indicate 0, the palette generator 143 assigns an index value to the gradation value (24 bits) of the pixel data piece. The palette generator 143 removes the lowest two bits of each RGB of the pixel data piece (of 24 bits or 8 bits for each RGB) to form the pixel data piece (of 18 bits or 6 bits for each RGB). The palette generator 143 then sets the assigned index value as an address and causes the 18-bit pixel data piece to be stored in the SRAM 144c.

As described above, the palette generator 143 generates a palette for each number of gradations. The palette that is generated for the largest number of gradations among the completed palettes (for which the number of index values that are assigned is sufficient) is selected as a palette that is used for the index conversion. The index converter 142 performs the index conversion on the original image data while referencing the SRAM that stores the selected palette.

In the first modified example, even when the number of index values that are assigned is not sufficient and the palette cannot be generated on the basis of the number of gradations of each piece of pixel data included in the original image data, the number of gradations of each piece of pixel data included in the original image data is reduced so that the palette can be generated. As a result, the image processing device 1 can maintain the image data as the indexed image data and available, memory space can be increased to the greatest extent possible.

In the first modified example, the number of times of access (to the SRAM 146) that is performed by the histogram generator 145 in order to read frequency data is 1 when the gradation value of each pixel data piece (to be processed) is represented by 24 bits; the number of times of access (to the SRAM 146) that is performed by the histogram generator 145 in order to read frequency data is 8 when the gradation value of each pixel data piece (to be processed) is represented by 21 bits; and the number of times of access (to the SRAM 146) that is performed by the histogram generator 145 in order to read frequency data is 64 when the gradation value of each pixel data piece (to be processed) is represented by 18 bits. Thus, a load of processing of the access to the SRAM 146 is increased.

To avoid this, the SRAM 146 may be divided into a plurality of regions so that frequency data that corresponds to consecutive gradation values can be read in parallel.

Figure 8:
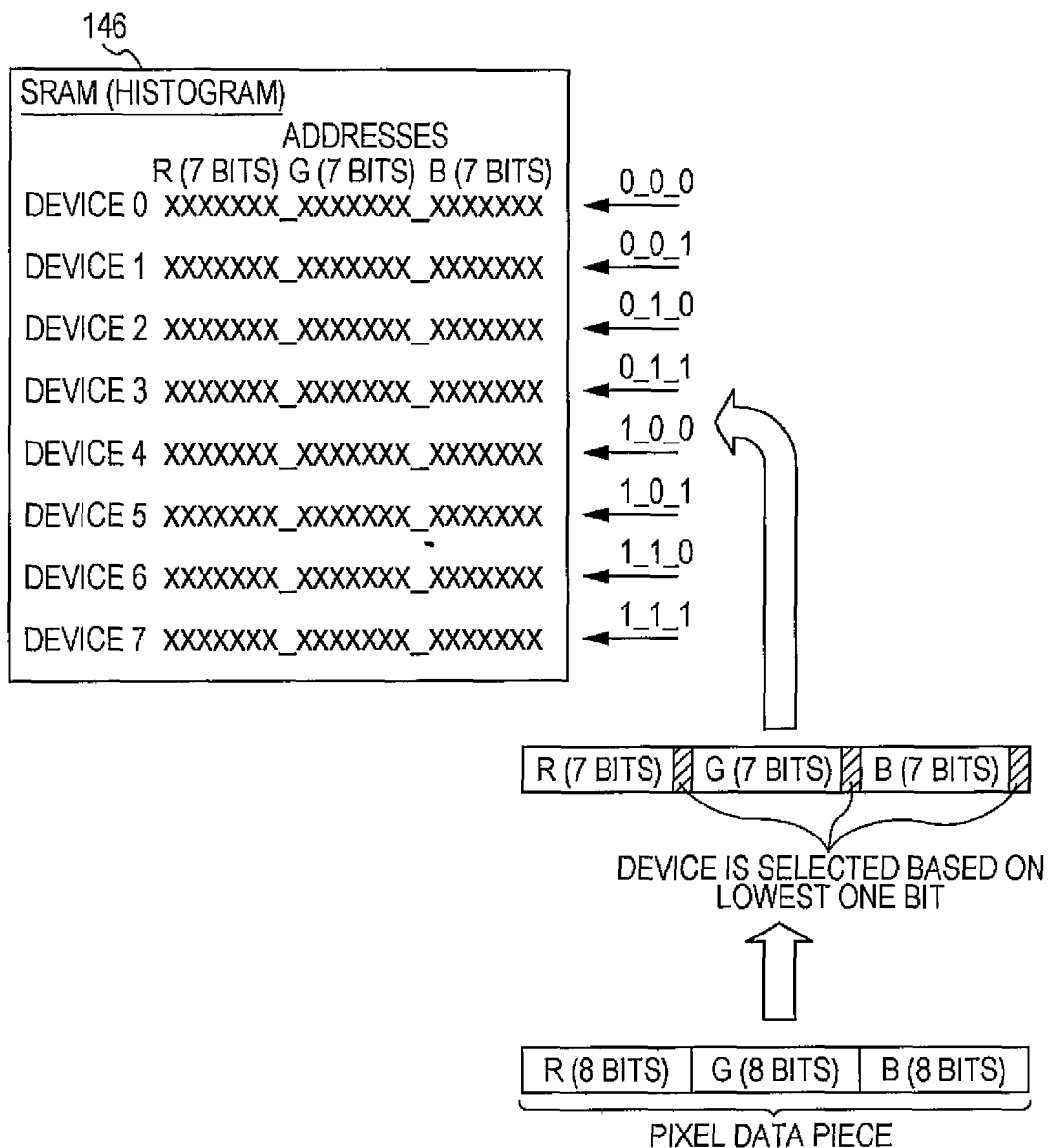
FIG. 8 is a diagram showing the configuration of the SRAM that stores the histogram and an accessing process (modified example 1).

Specifically, the SRAM 146 may be constituted by eight SRAM devices 0 to 7 as shown in FIG. 8. Each of the SRAM devices 0 to 7 has a capacity to store frequency data of 25 bits at each of $2^{21}$ addresses (2097152 gradations, or 7 bits for each RGB). Frequency data of a gradation value that has the same value of the lowest one bit of the RGB is stored in each of the SRAM devices 0 to 7.

The SRAM device 0 stores the frequency data that corresponds to a gradation value in which the lowest one bit of the RGB is 0, 0, 0, respectively. The SRAM device 1 stores the frequency data that corresponds to a gradation value in which the lowest one bit of the RGB is 0, 0, 1, respectively. The SRAM device 2 stores the frequency data that corresponds to a gradation value in which the lowest one bit of the RGB is 0, 1, 0, respectively. The SRAM device 3 stores the frequency data that corresponds to a gradation value in which the lowest one bit of the RGB is 0, 1, 1, respectively. The SRAM device 4 stores the frequency data that corresponds to a gradation value in which the lowest one bit of the RGB is 1, 0, 0, respectively. The SRAM device 5 stores the frequency data that corresponds to a gradation value in which the lowest one bit of the RGB is 1, 0, 1, respectively. The SRAM device 6 stores the frequency data that corresponds to a gradation value in which the lowest one bit of the RGB is 1, 1, 0, respectively. The SRAM device 7 stores the frequency data that corresponds to a gradation value in which the lowest one bit of the RGB is 1, 1, 1, respectively.

In order to generate the palette for gradation values of 24 bits, the histogram generator 145 sets the lowest one bit of the RGB (included in the pixel data piece that is to be processed) as device selection signals and sets the upper seven bits of the RGB as addresses and reads one frequency data piece from one of the SRAM devices.

In order to generate the palette for gradation values of 21 bits, the histogram generator 145 sets the lowest one bit (from the minimum value (000) to the maximum value (111)) of the RGB of the pixel data piece (to be processed) as device selection signals and sets the upper seven bits of the RGB of the pixel data piece as addresses and reads eight frequency data pieces from the eight SRAM devices in parallel.

In order to generate the palette for gradation values of 18 bits, the histogram generator 145 sets the lowest one bit (from the minimum value (000) to the maximum value (111)) of the RGB of the pixel data piece (to be processed) as device selection signals. In addition, the histogram generator 145 sequentially changes the lowest one bit of the upper seven bits of the RGB in order from the minimum value (000) to the maximum value (111) and performs a process for reading eight frequency data pieces from the eight SRAM devices in parallel eight times.

When the SRAM 145 has the aforementioned configuration, the number of times of access (to the SRAM 146) that is performed by the histogram generator 145 in order to read the frequency data can be reduced. In the aforementioned example, the number of times of access that is performed by the histogram generator 145 in order to generate the palette for gradation values of 24 bits is one; the number of times of access that is performed by the histogram generator 145 in order to generate the palette for gradation values of 21 bits is one; and the number of times of access that is performed by the histogram generator 145 in order to generate the palette for gradation values of 18 bits is eight.

In the first modified example, the SRAMs 144a, 144b and 144c are provided for the gradation values of 24, 21 and 18 bits, respectively. Either the SRAM 144b or the SRAM 144c may be provided without the SRAM 144a. In addition, either the SRAM 144b or the SRAM 144c and the SRAM 144a may be provided. In those cases, the size and capacity of the SRAM 144 can be reduced. In the first modified example, the reduced gradation values are represented by 21 bits and 18 bits. However, the gradation values may be represented by less than 18 bits.

Second Modified Example

Figure 9:
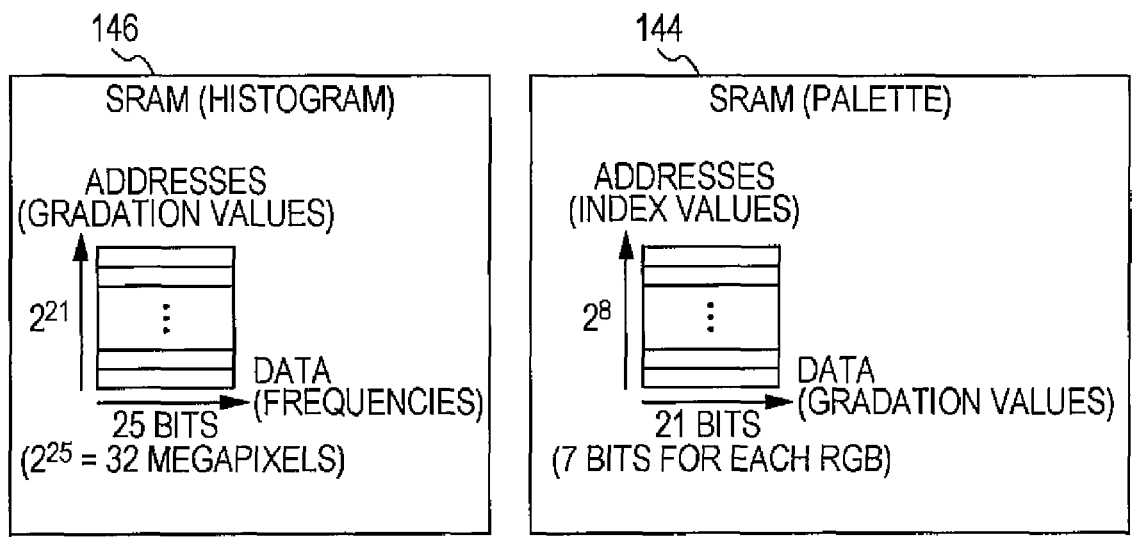
FIG. 9 is a diagram showing the size of the SRAM that stores the histogram and the size of the SRAM that stores the palette in which the amount of the data is reduced (modified example 2).

In the second modified example, both the capacity of the SRAM 144 (that stores the histogram) and the capacity of the SRAM 146 (that stores the palette) are reduced as shown in FIG. 9. The configuration of the SRAM 144 is the same as the SRAM 144b shown in FIG. 6.

The SRAM 146 has the capacity to store frequency data of 25 bits ($2^{25}$ can represent 32 megapixels) at each of $2^{21}$ (2097152 gradations) addresses.

Figure 10:
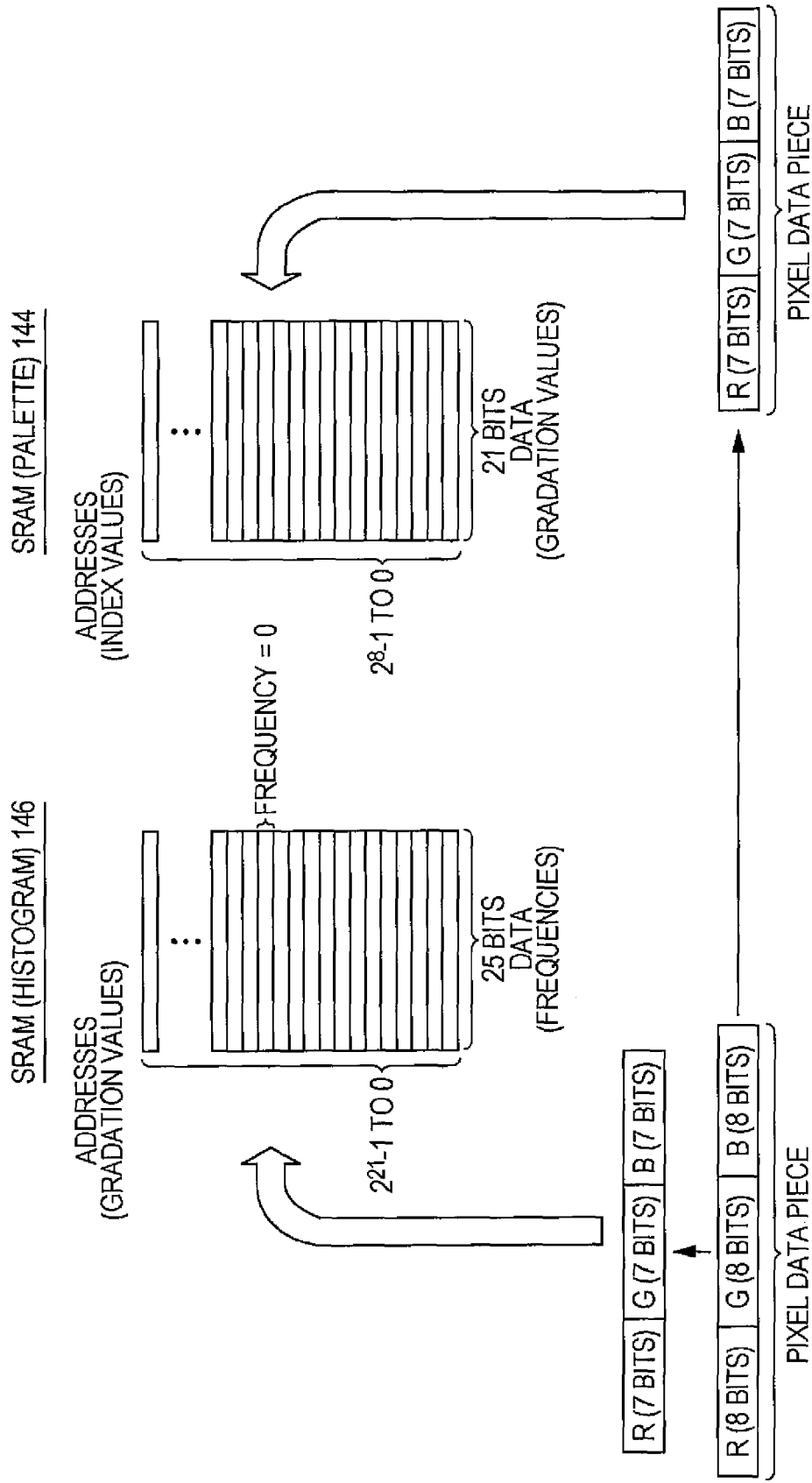
FIG. 10 is a diagram showing a process for generating a histogram and a process for generating a palette in the case where the amount of pixel data is reduced (modified example 2).

When the histogram generator 145 receives the pixel data piece (24 bits) from the controller 141, the histogram generator 145 removes the lowest one bit of the RGB of the pixel data piece as shown in FIG. 10. The histogram generator 145 sets the remaining pixel data piece (21 bits) as an address and reads frequency data from the SRAM 146 and outputs the frequency data. In addition, the histogram generator 145 increments the read frequency data by one and writes the incremented frequency data into the SRAM 146.

When the palette generator 143 receives the pixel data piece (24 bits) from the controller 141, the palette generator 143 removes the lowest one bit of the RGB from the pixel data piece as shown in FIG. 10. When the frequency data that is output from the histogram generator 145 and corresponds to the gradation value of the pixel data piece ((21 bits) that is to be processed) indicates 0, the palette generator 143 assigns an index value to the gradation value of the pixel data piece. Then, the palette generator 143 sets the index value as an address and writes the pixel data piece ((21 bits) that is to be processed) at the address of the SRAM 144.

According to the second modified example, even when the number of index values that are assigned is not sufficient and the palette cannot be generated on the basis of the number of gradations of each piece of pixel data included in the original image data, the number of gradations of each piece of pixel data included in the original image data is reduced so that the palette can be generated. As a result, the image processing device 1 can maintain the image data as the indexed image data, and available memory space can be increased to the greatest extent possible. In addition, since the number of gradations of each piece of pixel data is reduced before the generation of the histogram, a memory capacity that is necessary to generate the histogram can be reduced.

In the second modified example, the reduced number of gradations of each piece of pixel data is 21 bits. However, the reduced number of gradations of each piece of pixel data may be less than 21 bits. The number of gradations of each piece of pixel data stored in the SRAM 144 (that stores the palette) may be smaller than the number of gradations of each piece of pixel data stored in the SRAM 146 (that stores the histogram).

Second Embodiment

The second embodiment of the invention is described below with reference to the accompanying drawings. An image processing device 1 according to the second embodiment does not generate a histogram. Points that are different from the first embodiment are mainly described.

Figure 11:
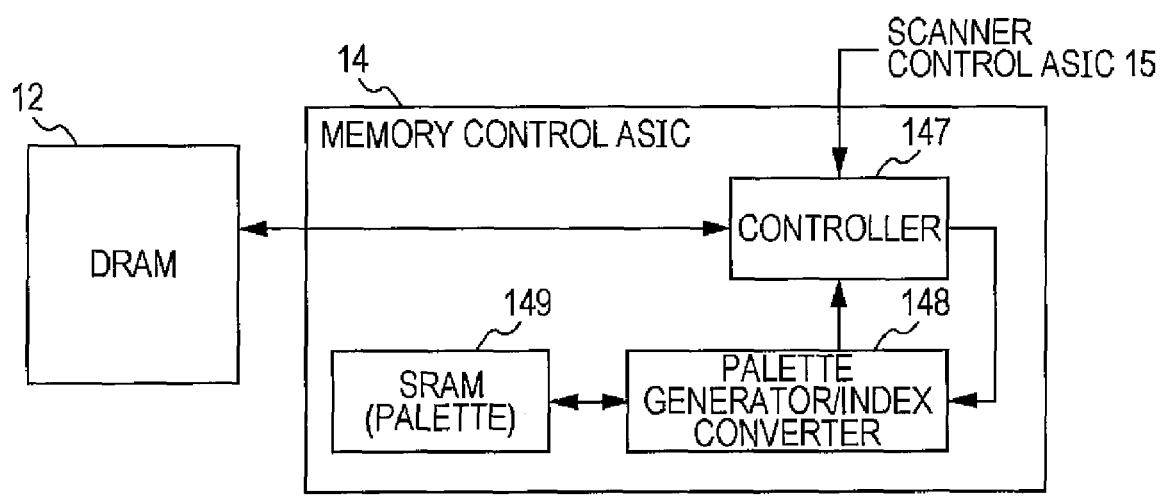
FIG. 11 is a block diagram showing an example of a configuration (that is related to palette generation and index conversion) of an image processing device according to a second embodiment of the invention.

FIG. 11 is a block diagram showing an example of a configuration (that is related to palette generation and index conversion) of the image processing device 1.

In the present embodiment, the memory control ASIC 14 has a function of generating a palette for image data output from the scanner control ASIC 15 and a function of performing index conversion on image data output from the scanner control ASIC 15. The memory control ASIC 14 includes a controller 147, a palette generator/index converter 148 and a SRAM 149.

The controller 147 is a circuit that controls the entire the memory control ASIC 14 and controls access to the DRAM 12. A section that controls access to the DRAM 12 may be independent of the controller 147.

For example, the controller 147 receives pixel data pieces that have been sequentially output from the scanner control ASIC 15. In addition, the controller 147 outputs the same pixel data pieces as the received pixel data pieces to the DRAM 12 and the palette generator/index converter 148.

In addition, the controller 147 sequentially receives index values of indexed image data from the palette generator/index converter 148. The controller 147 then outputs the index values to the DRAM 12. The controller 147 acquires the completed palette from the SRAM 149 and associates the palette with the indexed image data. The controller 147 then causes the indexed image data (associated with the palette) to be stored in the DRAM 12.

The palette generator/index converter 148 assigns an index value to each gradation value on the basis of the pixel data pieces that have been sequentially output from the controller 147. The palette generator/index converter 148 stores, in the SRAM 149, the gradation value that corresponds to each index value. In addition, the palette generator/index converter 148 converts the pixel data pieces into index values and outputs the index values to the DRAM 12 through the controller 147. In the present embodiment, the palette generator/index converter 148 performs the palette generation and the index conversion for each raster (that is image data of one line).

Figure 12:
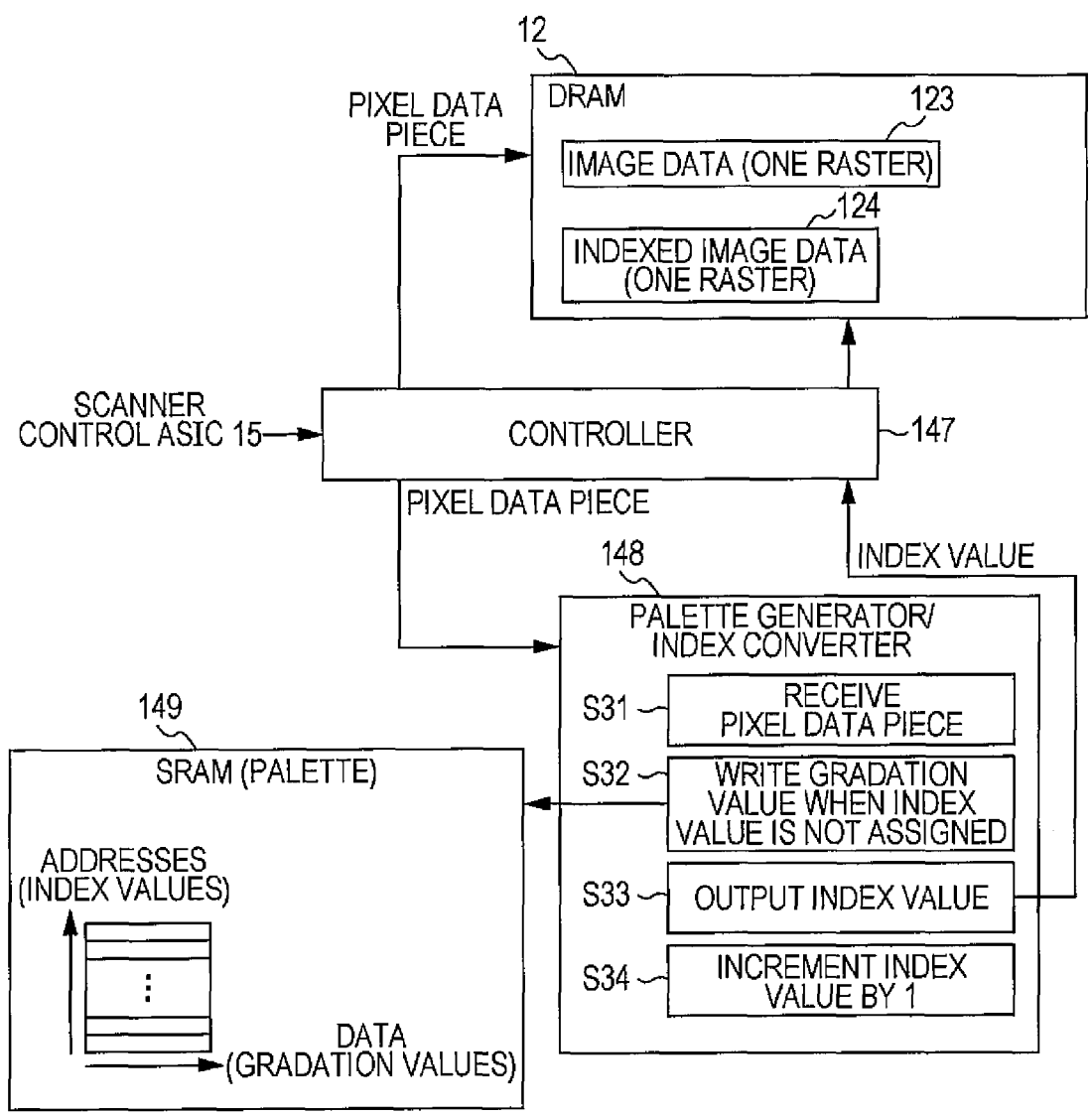
FIG. 12 is a diagram showing a process for the palette generation and a process for the index conversion, which are performed in the image processing device.

The SRAM 149 has regions to store data pieces (gradation values) at addresses (index values), respectively, in the same manner as the SRAM 144 shown in FIG. 2 (refer to FIG. 12). The SRAM 149 has a capacity to store a gradation value of 24 bits (8 bits for each RGB) at each of $2^8$ (256 index values) addresses.

FIG. 12 is a diagram showing a process for the palette generation and a process for the index conversion, which are performed in the image processing device 1. FIG. 12 shows the case in which image data of one raster is processed.

The controller 147 receives the pixel data pieces that have been sequentially output from the scanner control ASIC 15. The controller 147 outputs the same pixel data pieces as the received pixel data pieces to the DRAM 12 and the palette generator/index converter 148. In other words, the controller 147 sequentially writes the pixel data pieces into the DRAM 12 and causes image data 123 of one raster to be stored in the DRAM 12. While the controller 147 is performing this process, the palette generator/index converter 148 generates a palette for the image data 123 and performs the index conversion on the image data 123.

In addition, the controller 147 writes, into the DRAM 12, index values that have been sequentially output from the palette generator/index converter 148. The controller then causes indexed image data 124 (formed by causing the image data 123 of one raster to be subjected to the index conversion) to be stored in the DRAM 12. When the indexed image data 124 is completed, the image data 123 may be deleted from the DRAM 12.

The palette generator/index converter 148 performs steps S21 to S24 for each of pieces of pixel data.

In step S31, the palette generator/index converter 148 receives the pixel data piece from the controller 147.

In step S32, the palette generator/index converter 148 sequentially changes the index value in order from the minimum value to the assigned index value and reads gradation value data from the SRAM 149 for each index value (address). In addition, the palette generator/index converter 148 compares each read gradation value data with the gradation value of the pixel data piece received in step S31 to determine whether or not an index value is assigned to the gradation value data.

When an index value is not assigned to the gradation value of the pixel data piece that is to be processed, the palette generator/index converter 148 assigns an index value to the pixel data piece received in step S31. The palette generator/index converter 148 sets the index value as an address and writes the gradation value of the pixel data piece at the address of the SRAM 149. On the other hand, when an index value is assigned to the gradation value of the pixel data piece that is to be processed, the palette generator/index converter 148 does not write the gradation value of the pixel data piece into the SRAM 149.

In step S33, the palette generator/index converter 148 outputs, to the controller 147, the index value newly assigned to the pixel data piece (received in step S31) in step S32 or the assigned index value specified in step S32.

In step S34, when the palette generator/index converter 148 newly assigns the index value in step S32, the palette generator/index converter 148 increments the index value by one. In this case, when the incremented index value exceeds the predetermined maximum value (for example, 255 when the number of the index values is 256) and the pixel data piece (to be processed) is not the last pixel data piece of the image data of one raster, the palette generator/index converter 148 stops the generation of the palette for the image data of the raster. In other words, the palette generator/index converter 148 does not perform steps S31 to S34 on the next and subsequent image data.

In the aforementioned manner, the palette and the indexed image data are generated for each raster and stored in the DRAM 12. When the palette cannot be generated for the raster since the number of index values that are to be assigned is not sufficient, the original image data is maintained in the DRAM 12.

In the aforementioned example, the palette and the indexed image data are generated for each raster. However, the indexed image data that is formed by assigning all the index values (for example, 256 index values) and stored in the DRAM 12 may be regarded as one unit. Specifically, the sizes of the palettes generated for the generated indexed image data are the same, and the sizes of the indexed image data are not necessarily the same. In this configuration, there is no case where the palettes cannot be completed; it is not necessary for the DRAM 12 to maintain the original image data; and available memory space can be increased to the greatest extent possible.

In the aforementioned example, the controller 147 causes the image data 123 of one raster to be stored in the DRAM 12. However, another SRAM that can store image data of one raster may be provided, and the palette generator/index converter 148 may cause the image data (of one raster) output from the controller 147 to be stored in the SRAM.

The second embodiment of the invention is described above. According to the second embodiment, the efficiency of the index conversion (including the generation of the palette) can be improved. Specifically, the index conversion is performed using assigned index values while the palette is being generated in the present embodiment. Thus, it is not necessary to repeatedly access the palette in order to specify an index value that corresponds to the gradation value. Therefore, the index conversion is efficiently performed.

The embodiments of the invention describes the gist and scope of the invention as examples, and the invention is not limited to the embodiments. Many alternatives, changes and modified examples are understood by those skilled in the art.

In the embodiments, the histogram generation, the palette generation and the index conversion are performed on the image data that has been output from the scanner control ASIC 15. The invention, however, is not limited to this. The histogram generation, the palette generation and the index conversion may be performed on image data (that has been received by the I/O control ASIC 17 through the network I/F, the USB I/F or the parallel I/F) output from the I/O control ASIC 17.

The entire disclosure of Japanese Patent Application No. 2009-191528, filed Aug. 21, 2009 is expressly incorporated by reference herein.

What is claimed is:

1. An image processing device that processes multivalue image data comprising:
    a histogram storage section that stores an appearance frequency of each of gradation values;
    a palette storage section that stores the gradation value that corresponds to each of index values;
    an output section that accesses the histogram storage section for each of pieces of pixel data included in the image data and outputs the appearance frequency of the gradation value of the piece of pixel data;
    a histogram generator that accesses the histogram storage section for each piece of the pixel data included in the image data and adds one to the appearance frequency of the gradation value of the piece of pixel data; and
    a palette generator that assigns, when the appearance frequency that is output from the output section indicates 0, the index value to the gradation value and accesses the palette storage section and stores the gradation value that corresponds to the index value.

2. The image processing device according to claim 1, wherein
    a histogram and a palette are generated for each of pieces of image data of one frame.

3. An image processing device that processes multivalue image data comprising:
    a histogram storage section that stores an appearance frequency of each of gradation values;
    a palette storage section that stores a gradation value that corresponds to each of index values and is represented by bits that are fewer by a predetermined number of bits than bits that represent the gradation value of each of pieces of pixel data included in the image data;
    an output section that accesses the histogram storage section for each piece of the pixel data included in the image data and outputs appearance frequencies of a plurality of gradation values that have the same upper bits as the gradation value that is obtained by reducing the gradation value of the piece of pixel data by the predetermined number of bits;
    a histogram generator that accesses the histogram storage section for each piece of the pixel data included in the image data and adds one to the appearance frequency of the gradation value of the piece of pixel data; and
    a palette generator that assigns, when all the appearance frequencies that are output from the output section indicate 0, the index value to the gradation value obtained by reducing the gradation value of the piece of pixel data by the predetermined number of bits and accesses the palette storage section and stores the gradation value that corresponds to the index value.

4. The image processing device according to claim 3, wherein
    the histogram storage section is divided into a plurality of storage regions that are provided for the predetermined number of bits and can be accessed in parallel, and the storage regions store the appearance frequencies of the gradation values, respectively, each of the gradation values being represented by bits that are fewer by the predetermined number of bits than the bits of the gradation value of the piece of pixel data included in the image data, the values of the predetermined number of bits ranging from the minimum value to the maximum value, and
    the output section accesses the storage regions in parallel for each piece of the pixel data included in the image data and outputs, in parallel, the appearance frequencies of the gradation values obtained by reducing the gradation values of the pieces of pixel data by the predetermined number of bits.

5. An image processing device that processes multivalue image data comprising:
- a histogram storage section that stores an appearance frequency of each of gradation values, each of which is represented by bits that are fewer by a predetermined number of bits than bits of a gradation value of each of pieces of pixel data included in the image data;
- a palette storage section that stores the gradation value that corresponds to each of index values and is represented by bits that are fewer by the predetermined number of bits than the bits of the gradation value of the piece of pixel data included in the image data;
- an output section that accesses the histogram storage section for each piece of the pixel data included in the image data and outputs the appearance frequency of the gradation value that is obtained by reducing the gradation value of the piece of pixel data by the predetermined number of bits;
- a histogram generator that accesses the histogram storage section for each piece of the pixel data included in the image data and adds one to the appearance frequency of the gradation value that is obtained by reducing the gradation value of the piece of pixel data by the predetermined number of bits; and
- a palette generator that assigns, when the appearance frequency that is output from the output section indicates 0, the index value to the gradation value obtained by reducing the gradation value of the piece of pixel data by the predetermined number of bits and accesses the palette storage section and stores the gradation value that corresponds to the index value.

* * * * *